June 12, 1962 H. ALLEN 3,038,489
VALVES

Filed April 6, 1960 2 Sheets-Sheet 1

Herbert Allen
INVENTOR.

BY Browning, Simms,
Hyer and Eickenroht
ATTORNEYS

June 12, 1962        H. ALLEN        3,038,489
VALVES
Filed April 6, 1960        2 Sheets-Sheet 2
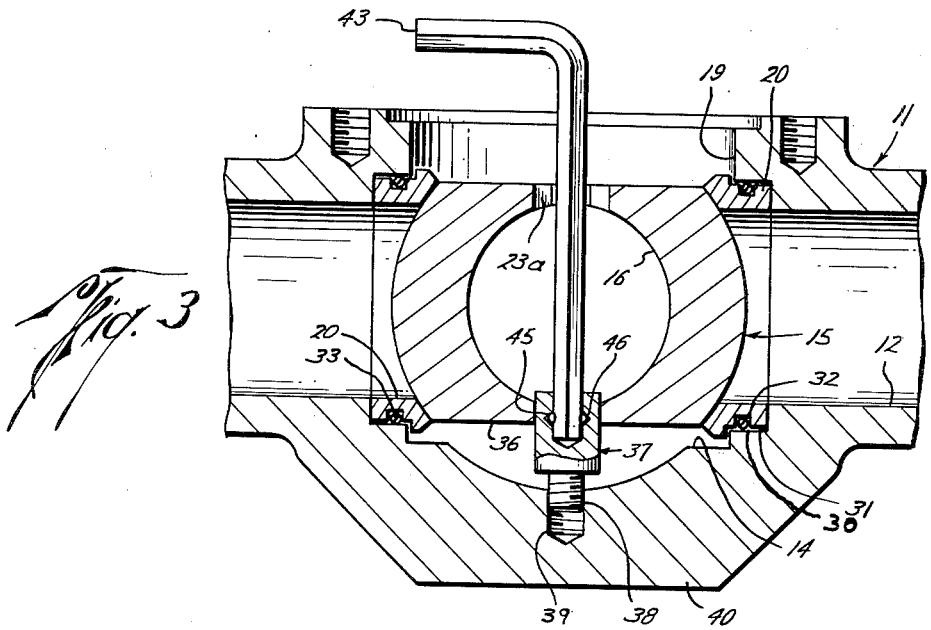
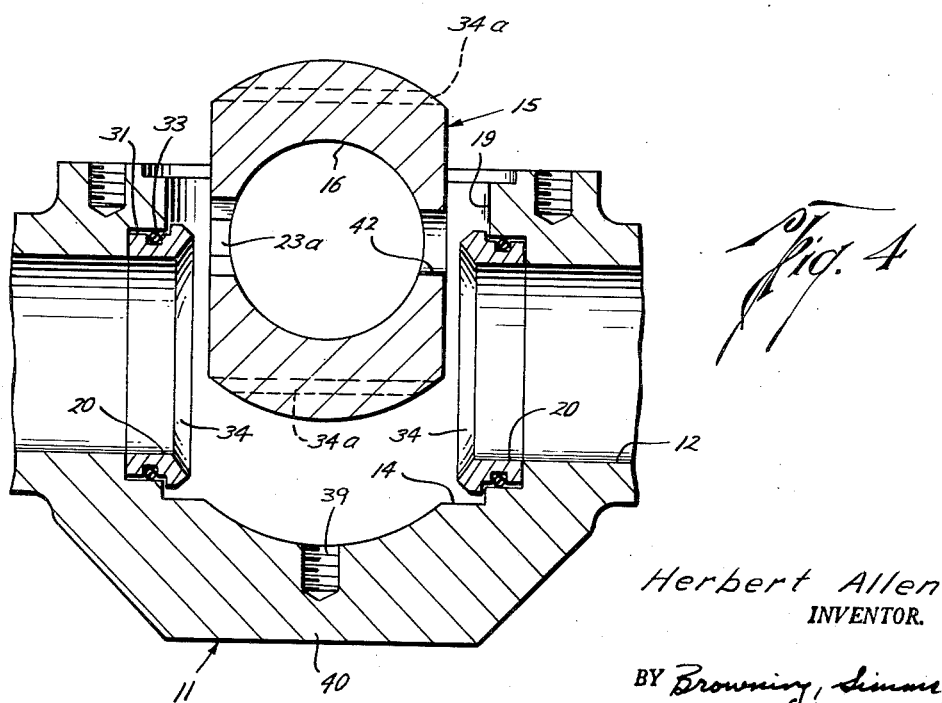
Herbert Allen
INVENTOR.
BY Browning, Simms,
Hyer and Eickenroht
ATTORNEYS

United States Patent Office 3,038,489
Patented June 12, 1962

3,038,489
VALVES
Herbert Allen, Houston, Tex., assignor to Cameron Iron Works, Inc., Houston, Tex., a corporation of Texas
Filed Apr. 6, 1960, Ser. No. 20,365
7 Claims. (Cl. 137—315)

This invention relates generally to valves; and, more particularly, to improvements in ball-type rotary plug valves.

It is often necessary to remove a valve member from the valve body for replacement or repair. This is also true of annular seats commonly carried within the body for sealing between the body and valve member in its closed position. In rotary plug valves having cylindrical or conical valve members, this is generally accomplished without breaking the connection of the valve body in the line by removal of a bonnet to uncover a side opening in the body of sufficient size as to pass the valve member and seats.

However, ball plug valves present a particular problem in this respect because of the construction and arrangement of the seats and valve member. That is, in its preferred form, such a valve has opposed spaced apart valve seats which are carried by the body concentric of the flow passageway therethrough. The valve seats, at their outer ends adjacent the body, are provided with cylindrical sealing surfaces for forming a seal between the seats and body, and, at their inner ends adjacent the valve member, are provided with annular seating surfaces for engaging corresponding annular seating surfaces on the valve member. These annular seating surfaces are substantially spherical about a center lying within the axis of rotation of the valve member. Thus, when, as is preferred, the seats are of relatively rigid material, the portions of the opposed inner ends of the seats adjacent the opening in the body ordinarily prevent the valve member from being moved therebetween.

In addition to this preferred seating arrangement, and particularly in the case of high pressure plug valves having relatively large flowways therethrough, it is considered desirable to provide supporting means for supporting the valve member in its operative position between the valve seats against movement in a direction lateral to its normal control direction of rotation. In its preferred form, such supporting means comprises a pintle carried on either the valve member or the valve body, and is adapted to engage the other of these elements in such a manner as to permit rotation of the valve member about its control axis, but to limit or prevent its movement in a direction lateral to this control direction of rotation.

The phrases "lateral rotation," "lateral movement," "movement in a direction lateral to its normal control direction of rotation," and phrases of similar import used in the specification and claims are intended to include rotary movement of the valve member by rotation in a direction other than the normal control direction of rotation about its control axis, and, in addition, to include the sidewise movement or downstream displacement of the valve member transversely of its control axis of rotation resulting from the side thrust on the valve member when it is closed.

Many valve designs have been proposed in an attempt to overcome these assembly difficulties and at the same time provide the desired support for the valve member. For example, in some designs the valve body is formed in two parts, the body generally being split intermediate the valve seats in a direction perpendicular to the flow passageway through the valve. While valves of this type are easily assembled and permit the use of a pintle for supporting the valve member, as well as the preferred valve seats which have inner spherical seating surfaces and outer cylindrical sealing surfaces, they are otherwise objectionable in several respects. For example, when such a valve is made up in a line, it is necessary to break the connection between the valve and the line for replacement or repair of the valve member or seats. In addition, such designs increase the likelihood of leaks and at the same time increase the cost of construction by a substantial amount.

Other designs provide for a unitary valve body and a pintle for supporting the valve member, but require the use of at least one seat which has a flat, rather than a cylindrical outer sealing surface adjacent the body for forming a seal with a corresponding flat sealing surface on the valve body. While such designs provide for supporting the valve member and permit the removal of the valve member and seats for replacement or repair without disturbing the connection between the valve and line, they are otherwise objectionable in that they increase the likelihood of leakage, particularly in high pressure valves having flowways of large diameter, since such valve bodies tend to balloon or expand under pressure. In general, such seating arrangements become progressively less satisfactory as the operating pressure and size of the valve flowways increase. In addition, these designs increase the cost of construction materially and are considered objectionable in this respect similarly as in the case of the split body valve.

In the valve shown in my application, Serial Number 819,109, filed June 9, 1959, and entitled, "Valves," these difficulties are overcome by providing a ball type rotary plug valve in which the valve member is supported by a pintle attached to the valve member, and which has opposed valve seats of the preferred design concentric of the flow passageway through the valve, the seats being urged inwardly into engagement with the seating surface on the valve member by means which is outwardly yieldable an axial distance at least as great as the axial component of the seating surfaces, so that the seats may be moved apart to permit movement of the valve member and attached supporting pintle from between the seats and through a side opening in the valve body.

Although this valve design comprises a substantial improvement and overcomes the difficulties encountered in use of previously known ball-type rotary plug valves, nonetheless, it is considered desirable to provide a valve of this general type in which the valve member and seats may be removed through the side opening in the valve body without substantial axial movement of the valve seats. That is, it is considered desirable to provide a ball-type rotary plug valve having a unitary body and valve seats of a preferred design carried by the body, in which the valve seats are not required to move with respect to the body or with respect to each other to move the valve member between the seats and through a side opening in the body.

The valve shown in Humphreys Number 2,333,424 exemplifies designs proposed for this type of service. Here, the valve seats are formed integrally of the valve body and the valve member is formed on a reduced dimension along its control axis of rotation, adapting the valve member, upon rotation in a direction lateral to its normal control direction of rotation, to be moved between the seats and removed through a lateral opening in the body for repair or replacement. While the Humphreys valve permits the removal of the valve member without breaking the connection between the valve and the line and without requirement of axial movement of the valve seats, it is considered otherwise objectionable for several reasons.

For example, the valve seats provide the sole support for the valve member against lateral displacement due to the side thrust against the upstream side of the valve member. Thus, Humphreys does not provide for means, such as a pintle, for supporting the valve member in its operative position between the valve seats. Further, since the valve seats provide the sole support for the valve member against downstream displacement, it is considered desirable to form the seats integrally of the valve body, rather than to provide separate seats slidably mounted on the body as is preferred.

An object of this invention is to provide a ball-type rotary plug valve which obviates the foregoing difficulties.

Another object is to provide a ball-type rotary plug valve having a unitary body and valve seats of the described preferred design, in which the valve member is supported against movement in a direction lateral to its normal control direction of rotation, and the valve member and seats are removable for replacement or repair through a lateral opening in the valve body without breaking the connection between the valve and line, and without substantial axial movement of the valve seats.

A more particular object is to provide such a valve in which the supporting means is operable from outside the valve body to release the valve member so that it may be removed through the lateral opening in the body without requirement of an extra opening in the body providing access to the supporting means.

Another particular object is to provide a valve according to the foregoing object in which the valve stem not only operates the valve member, but also cooperates with the supporting means for supporting the valve member against lateral movement.

Other objects are inherent and will become apparent upon consideration of the specification, claims and attached drawings.

These and other objects are accomplished in accordance with this invention by a ball plug valve having a unitary body and valve seats of the preferred design, the valve member being formed on a reduced dimension along its axis adapting it, upon rotation in a direction lateral to its normal control direction of rotation, to be slipped between the seats and through a lateral opening in the valve body for replacement or repair, without requirement of breaking the connection between the valve and line and without substantial axial movement of the seats, in which the valve member is releasably supported against lateral movement by supporting means which is normally connected to either the inner wall of the valve body or to the lower end of the valve member, and has a surface at the other end releasably engaging the other of these elements, the supporting means being operable from outside the valve body to release the valve member to lateral movement. In the form here illustrated, the supporting means is operable through the lateral opening in the body by means including a bore through the valve member providing access to the supporting means for operating it, when the valve member is in its normal operative position between the valve seats, to either release the valve member to lateral movement on the one hand or to support the valve member against lateral movement on the other hand.

For a more detailed description of the invention, reference is made to the accompanying drawings illustrating a preferred embodiment of the invention wherein like characters are used to designate like parts:

FIG. 3 is a longitudinal sectional view of a portion of the valve shown in FIG. 1 in a partly disassembled condition, wherein the bonnet has been removed uncovering a lateral opening in the valve body, and showing the supporting pintle being operated to disconnect it from the body so that it may be removed therefrom through an access opening in the valve member;

FIG. 4 shows the valve of FIG. 3 in a further stage of disassembly in which the pintle has been removed and the valve member rotated ninety degrees in a lateral direction from the position shown in FIG. 3, thereby freeing it from the seats, the valve member being shown as it is being moved between the seats and through the lateral opening in the valve body.

Figure 1:
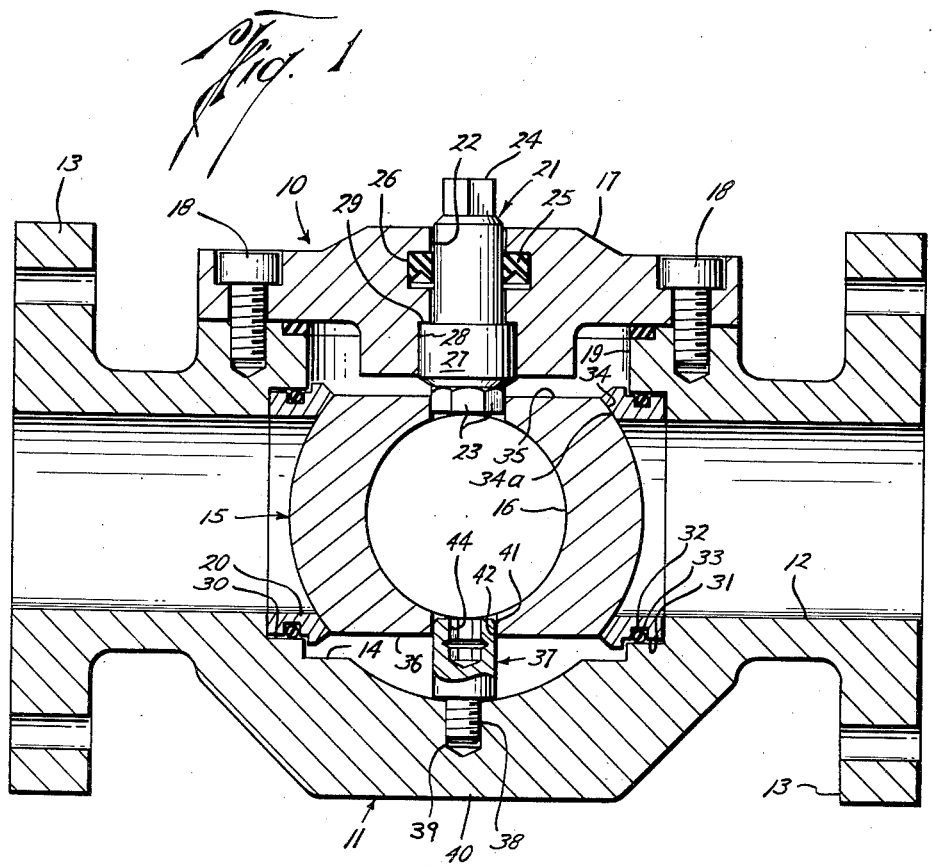
FIG. 1 is a longitudinal sectional view of an assembled valve constructed in accordance with this invention, wherein the valve member is releasably supported between the valve seats by a pintle which is removably connected to the inner wall of the valve body, the valve member shown in closed position.

Referring now to the drawings, the valve 10 comprises body 11 having a flow passage 12 therethrough and flanged ends 13 for connection in a line. The flow passageway 12 is intersected by a chamber 14 within the body to receive a valve member 15 having a port 16 therethrough. The port 16 is arranged with its axis parallel to the axis of the flow passageway so that the valve member may be rotated about an axis transverse thereto between the closed position of FIG. 1 and an open position in which the port is in registration with the flow passageway through the valve. The fluid controlled may flow into the valve body in either direction, so that the inlet and outlet thereto may comprise a portion of the flow passageway on either the left or the right side of chamber 14.

A lateral opening 19 in body 11 provides access to chamber 14 from outside the body, opening 19 normally being closed by a bonnet 17 which is connected to body 11, as by recessed bolts 18. Opening 19 is formed to permit movement therethrough of seats 20 as well as valve member 15 when it is rotated to the position shown in FIG. 4. In this connection, it will be understood that opening 19 may be circular in cross section and sufficiently large to pass the largest dimension of valve member 15, or, as is the case in the form here shown, may be non-circular with its major diameter transversely of the flow passageway through the valve and sized to permit passage therethrough of valve member 15 when it is rotated to the position shown in FIG. 4.

Valve stem 21 is rotatably mounted in bore 22 in bonnet 17, and is provided at its lower end with surfaces 23 which non-rotatably engage corresponding surfaces 23a on valve member 15 for moving the valve member between the opened and closed position. As will be explained in more detail below, the engagement between the surfaces on the valve member and stem not only provides means for operating the valve, but also provides additional support for the valve member against lateral movement. The valve stem is operated to open and close the valve member in a conventional manner, as by a handle (not shown) which may be connected to the non-round upper end 24 of the stem. Obviously, suitable locating means may be employed for locating the valve member in the open and closed positions.

A chevron type packing 25 is carried in annular groove 26 in bonnet 17 and forms a sliding seal about stem 21 during rotation of the valve member between open and closed positions. Stem 21 is formed near its lower end on an enlarged diameter 27, which is rotatably received in counter bore 28. As can be seen in FIG. 1, an abutment surface 29 is thereby provided between stem 21 and bonnet 17 for preventing radially outward movement of the stem due to pressure acting across the stem area in either chamber 14 or port 16.

Recesses 30 in body 11 extend axially outwardly from chamber 14 and concentrically outwardly of the flow passageway 12 on each side of chamber 14 to receive seats 20, which are preferably of metal or other relatively rigid material. At its outer end and adjacent body 11, each of seats 20 is provided with a cylindrical sealing surface 31 in which is formed an annular groove 32 for containing an O-ring type seal 33, adapting the seats to be slidably and sealably received in recess 30 for slight movement on the body axially of flow passageway 12. Thus, when the valve is closed, pressure acting across the outer end of the upstream seat will urge the seat axially inwardly into sealing engagement with valve member 15. Although seats 20 are slidably mounted on the body and are adapted for slight movement toward and away from each other, such movement is not sufficient to permit the valve member to be withdrawn therebetween.

As can be seen in FIGS. 1 and 4, the inner ends of seats 20 are provided with annular seating surfaces 34 which cooperate with corresponding annular seating surfaces 34a on valve member 15 to form a seal between the seats and valve member when the valve is in the closed position. As previously mentioned, these annular seating surfaces are substantially spherical about a center lying within the axis of rotation of valve member 15. Thus, the outer diameters of these seating surfaces are disposed outwardly of their inner diameters in a direction axially of the seats so that the valve member is normally confined against radial movement from between the seats.

However, it will be recalled that it is considered necessary that means be provided for removing both the valve member and the seats from the body in the event they require replacement or repair, and, further, it is desirable that these elements be removable without breaking the connection between the valve and line, and without axial movement or spreading of the valve seats to permit passage of the valve member therebetween.

For this purpose, valve member 15 is formed on a reduced dimension along its control axis of rotation, adapting it, upon rotation in a direction lateral to its normal control direction of rotation, to be freed from the seats and removed from the body through opening 19. More particularly, valve member 15 has truncations on its outer surface which are perpendicular to its control axis of rotation and define upper and lower parallel spaced apart plane surfaces 35 and 36, respectively. The distance between these parallel plane surfaces is less than the distance between the inner ends of valve seats 20. Thus, when the valve member is rotated so as to bring these plane surfaces into parallel relationship with the seats (FIG. 4), the valve member may be slipped between the inner opposed ends of the seats and removed through the lateral opening 19 for replacement or repair. Of course, when the valve member has been removed, the seats may be slipped inwardly into chamber 14 a sufficient distance to free them from the recesses 30, so that they also may be removed through opening 19.

To provide the necessary support for valve member 15, and as most clearly seen in FIG. 1, a pintle 37 is removably connected at its lower end, as by threaded connection 38, to the inner wall of body 11, opposite the lateral opening 19. It will be seen that well 39 for receiving the threaded end of pintle 37 is disposed axially of valve member 15, and is bottomed intermediate the inner and outer surfaces of body wall 40, whereby the outer surface of the wall is formed smooth and without openings therethrough. Surface 41 at the upper end of the pintle is rotatably received in the lower portion of bore 42 in valve member 15, whereby the valve member may be rotated about its control axis between the open and closed positions, but is otherwise limited in movement in a direction lateral to this control direction of rotation.

It will be recalled that it is considered necessary to periodically remove the valve member and seats from the valve body for replacement or repair, and that this is accomplished in the illustrated form of the valve of this invention, without breaking the connection between the valve and line and without axial movement of the valve seats by rotating the valve member in a lateral direction to thereby free it from the seats so that it may be removed from the body through the lateral opening therein. However, since the valve member is normally supported against lateral movement by engagement of pintle 37, the pintle must first be disengaged to release the valve member to such lateral rotation. For this purpose, and according to one of the novel features of this invention, axial bore 42 is formed in valve member 15 providing access to pintle 37 from outside the body when the valve member is in its normal operative position between the valve seats, for operating the pintle to disengage the valve member and release it to lateral rotation. As can be seen, bore 42 is intersected by port 16 and divided into an upper portion and a lower portion for receiving and providing a surface for engaging the stem and pintle, respectively, when the valve is assembled.

More particularly, and according to another of the novel features of this invention, pintle 37 is formed on a diameter slightly smaller than the diameter of bore 42 adapting it, upon disconnection from the body, to be moved axially through the valve member and removed from the body through opening 19. As can be seen most clearly in FIG. 3, this is accomplished by removing bonnet 17 and inserting a suitable tool 43 through bore 42 and into the well 44 formed in the upper end of pintle 17, whereby spring loaded balls 45 on tool 43 engage annular groove 46 in the pintle so that the pintle may be carried on the tool when it is disconnected from the body. As can be seen, tool 43 and well 44 have corresponding non-round surfaces whereby the pintle can be disconnected from the body by turning the tool in the proper direction.

When the pintle has been disconnected from the body and while it is carried on the end of the tool, both the tool and the pintle are withdrawn from the body through bore 42 and opening 19, whereupon the valve member may be rotated for removal from the body as shown in FIG. 4.

To reassemble the valve, the foregoing procedure is reversed. That is, the valve member is moved through the lateral opening in the body and between the valve seats. The valve member is then rotated laterally to its operative position between the valve seats and with bore 42 aligned with well 39. Pintle 37 is then connected to the tool and inserted through opening 19 and bore 42 and into its connected position as shown in FIG. 1. Opening 19 is then covered by bonnet 17 and the valve is ready to be put back into service.

Figure 2:
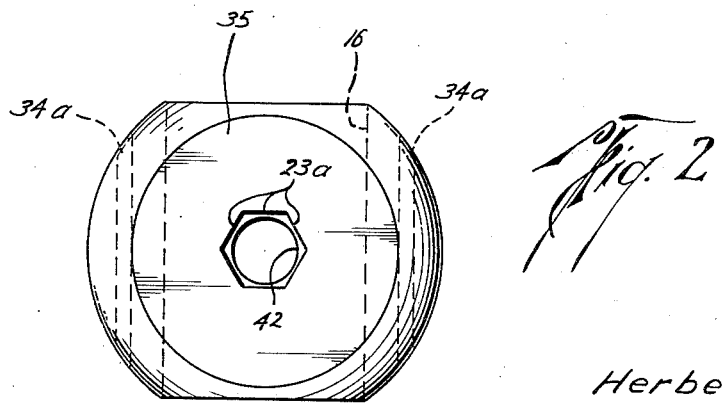
FIG. 2 is a top plan view of the valve member shown in FIG. 1 removed from the valve body.

According to still another novel feature of this invention, valve stem 21 cooperates with pintle 37 to provide additional support for the valve member 15 against lateral movement. This is accomplished in the embodiment shown by providing surfaces 23a in the upper portion of bore 42 which are adapted to engage corresponding surfaces 23 on the lower end of valve member 21 to thereby provide a non-rotatable and axially slidable releasable connection between the stem and valve member. As can be seen in FIGS. 1 and 2, this upper portion of bore 42 is formed on an enlarged dimension and is sized to slidably but closely receive the lower end of the valve stem. Thus, when bonnet 17 is mounted on the body to cover opening 19, valve stem 21 is received in the upper portion of bore 42 to provide a means for controlling the valve member and at the same time to additionally support the valve member against lateral movement. It will be noted that the enlarged diameter 28 on stem 21 provides a bearing surface for maintaining the stem 21 in proper alignment even though the stem is subjected to lateral deflection due to the side thrust on the valve member.

From the foregoing, it will be seen that this invention is one well adapted to attain all of the ends and objects hereinabove set forth, together with other advantages which are obvious and which are inherent to the apparatus. Thus, the embodiment of the invention herein described provides a ball-type plug valve having valve seats of the preferred design in which the valve member and seats may be removed for replacement or repair through a lateral opening in the valve body without requirement of breaking the connection between the valve and the line, and without substantial axial movement of the seats to permit the valve member to be moved therebetween. Further, the valve member is supported against lateral movement, when in its operative position between the valve seats, by supporting means which is operable from outside the valve body without requirement of an extra access opening therein, to release the valve member for lateral rotation so that it may be freed from the seats and removed from the body through the lateral opening therein. Also, the valve stem not only provides a means for moving the valve member between the open and closed positions, but also cooperates with the supporting means to provide additional support for the valve member against lateral movement.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

The invention having been described, what is claimed is:

1. A valve comprising, a body having a flow passageway therethrough, an intermediate chamber intersecting said passageway, and a lateral opening into said chamber; opposed spaced apart valve seats in the body concentric of the flow passageway adjacent said chamber, said seats having spherical seating surfaces exposed to said chamber at their inner opposed ends; a rotatable ball valve member in said chamber having a port therethrough and normally cooperating with the seats for controlling flow through the valve, said ball valve member being formed on a reduced dimension along its control axis of rotation adapting it, upon rotation in a direction lateral to its normal control direction of rotation, to be slipped between the seats for insertion or removal from the body through said lateral opening therein; a valve stem normally extending through said lateral opening and releasably engaging said valve member at its upper end for rotating the valve member between its open and closed positions; supporting means within the body releasably engaging the valve member at its lower end for supporting the valve member against substantial movement in a direction lateral to its normal control direction of rotation, said supporting means being operable through the lateral opening in said body to release the valve member for lateral movement.

2. A valve comprising, a body having a flow passageway, an intermediate chamber intersecting said passageway, and a lateral opening into said chamber; opposed spaced apart valve seats in the body concentric of the flow passageway adjacent said chamber, said seats having sperical seating surfaces exposed to said chamber at their inner opposed ends; a rotatable ball valve member in said chamber having a port therethrough and normally cooperating with the seats for controlling flow through the valve, said ball valve member being formed on a reduced dimension along its control axis of rotation adapting it, upon rotation in a direction lateral to its normal control direction of rotation, to be slipped between the seats for insertion or removal from the body through said lateral opening therein; a valve stem normally extending through said lateral opening and releaseably engaging said valve member at its upper end for rotating the valve member between its open and closed position; supporting means situated within the body opposite the lateral opening therein releasably engaging the valve member at its lower end for supporting the valve member against substantial movement in a direction lateral to its normal control direction of rotation; and means including a bore through the valve member, providing access to said supporting means through said lateral opening in the body for operating the supporting means, when the valve member is in its normal operative position between the valve seats, to release the valve member for said lateral rotation.

3. A valve according to claim 2 wherein said supporting means comprises, a pintle removably connected to the inner surface of the body, said pintle being formed on a diameter slightly smaller than the diameter of the bore through the valve member, adapting the pintle, when the valve member is in its normal operative position between the seats, to be inserted through the bore in the valve member and connected to the body for supporting the valve member against lateral movement, and to be disconnected from the body and removed therefrom through the bore in the valve member for permitting lateral rotation of the valve member, whereby the valve member may be inserted or removed from the body through the lateral opening therein.

4. A valve comprising, a body having a valve chamber and a flow passageway intersecting the chamber at opposed sides thereof, said body also having a lateral opening therein providing access to said chamber; a bonnet removably mounted on the body and normally closing said lateral opening; opposed spaced apart valve seats on the body concentric of the flow passageway at the connections between the chamber and flow passageway, said seats having spherical seating surfaces at their innner opposed ends exposed to said chamber and cylindrical sealing surfaces at their outer ends adjacent the body; a ball valve member having a port therethrough normally mounted between the inner opposed ends of the valve seats for rotation about an axis transverse of the flow passageway and cooperating with the seats for controlling flow through the valve, said ball valve member having truncations substantially perpendicular to its control axis of rotation defining substantially parallel spaced apart plane surfaces on the valve member, the distance between said plane surfaces being less than the distance between the valve seats to free the valve member from the seats, upon rotation in a direction lateral to its normal control direction of rotation, for introduction or removal of the valve member from the body through said lateral opening; a valve stem carried by said bonnet for rotation and normally engaging said valve member for operating it to open and close the valve for controlling flow therethrough; supporting means connected at one end to the inner wall of the body opposite the lateral opening therein and having a surface at the other end for engaging the valve member and supporting it against movement in a direction lateral to its normal control direction of rotation, said supporting means being operable from outside the body to disengage said surface and release the valve member for lateral movement; and means including a bore through the valve member providing access to said supporting means from outside the body and through the lateral opening therein, when the valve member is in its normal operative position between the seats, for operating the supporting means and releasing the valve member to said lateral movement, whereby the valve member may be rotated in a lateral direction to free it from the seats for removal from the body through said lateral opening.

5. A valve according to claim 4 wherein the outer surface of the body wall opposite the lateral opening is formed substantially continuous and without openings therethrough for providing access to said supporting means.

6. A valve according to claim 5 wherein said stem, bore and supporting means are normally coaxial with the control axis of rotation, and said supporting means comprises a pintle being removably connectable at its lower end to the inner wall of the body and having a surface at its upper end adapted to engage the lower portion of the bore through the valve member, when the pintle is connected to the body, in a manner to permit rotation of the valve member about its control axis and to limit movement of the valve member in a direction lateral to its control direction of rotation, said pintle being formed on a diameter slightly smaller than the diameter of the bore through the valve member, adapting the pintle, when the valve member is in its normal operative position between the seats and the bonnet is removed uncovering said lateral opening in the body, to be moved through the bore in the valve member and connected to the body, thereby engaging the valve member and supporting it against lateral movement, and to be disconnected from the body and moved through the bore in the valve member and the lateral opening in the body, to thereby disengage the valve member and release it to said lateral movement, whereby the valve member may be rotated in a lateral direction to free it from the seats for removal from the body through said lateral opening.

7. A valve according to claim 6 wherein said stem has a surface at its lower end for closely and non-rotatably engaging a corresponding surface formed in the upper portion of the bore in said valve member, adapting the stem, when the bonnet is connected to the body, to be inserted into said bore for rotating the valve member about its control axis between the open and closed positions, and for additionally supporting the valve member against lateral movement.

References Cited in the file of this patent

UNITED STATES PATENTS

| | | |
|---|---|---|
| 2,201,895 | Glen | May 21, 1940 |
| 2,333,424 | Humphreys | Nov. 2, 1943 |
| 2,837,308 | Shand | June 3, 1958 |